United States Patent Office.

THOMAS SIM, OF BALTIMORE, MARYLAND, ASSIGNOR TO HIMSELF AND JESSE L. HUTCHINSON, OF SAME PLACE.

Letters Patent No. 106,626, dated August 23, 1870.

IMPROVEMENT IN THE MANUFACTURE OF FERTILIZERS.

The Schedule referred to in these Letters Patent and making part of the same

*To all whom it may concern:*

Be it known that I, THOMAS SIM, of the city of Baltimore, in the State of Maryland, doctor of medicine, have invented a new and useful Improvement in the Manufacture of Fertilizers; and that the following is a suffficient description thereof to enable one skilled in the art to which my said invention appertains to carry it into effect.

The nature of my invention consists in divesting of oil, by chemical means, cotton-seed meal, or any other vegetable or suitable animal matter, and employing this residuum, after the removal of the oil, as a source of ammonia, to mix with bone or other phosphate of lime, the compound thus formed, and which is the subject of my invention, constituting a fertilizing agent of great value, and comparatively small cost.

In carrying out my invention I prefer to proceed as follows:

I place the cotton-seed meal, or other material, in a high vat, at the lowest part of which I introduce liquid bisulphide of carbon, or other suitable chemical agent, which, rising through the meal, and permeating its entire mass, completely removes the oil therefrom, and the combined oil and bisulphide, flowing over into a receiver, may be separated in any of the known modes.

This process is continued until the bisulphide, coming over free from oil, indicates that the oil is all removed from the meal, and the meal or residuum is then freed from the chemical by evaporating the latter.

The value of the oil obtained by this process, over and above the amount that can be separated by pressure, will more than pay the entire cost of the operation; the bisulphide of carbon, separated and recovered by vaporization and condensation, may be used again and again, and the meal divested of oil is in a much better condition for the manufacture of fertilizers than in its natural state.

The residuum is afterwards mixed with phosphate of lime, in any convenient or available form, such, for example, as bone-dust, Peruvian or other guano, or any other fertilizing material; but my immediate and special purpose has been to use the material found in great abundance in the natural phosphate beds of South Carolina, or any similar deposits which may elsewhere exist.

My residuum of cotton-seed, or other material, divested of oil by a chemical agent, constitutes, practically, a new source of ammonia for mixing with the phosphates referred to, and forms, in admixture therewith, a new compound of great value as a fertilizer.

The invention is not confined to cotton-seed as a source of ammonia; but any seed, root, or other material possessing similar properties, and being sufficiently cheap and abundant, may be substituted therefor, and used in the same manner.

Having thus described my invention,

What I claim as new therein, and desire to secure by Letters Patent, is—

A fertilizing material, produced by the combination of cotton-seed residuum, or other matter, divested of oil by chemical means, with phosphate of lime, substantially as described.

THOS. SIM.

Witnesses:
NELSON LE ARMS,
J. A. JOHNSON.